July 10, 1945.    A. M. THOMSEN    2,380,087
PROCESSING OF MOLASSES AND THE LIKE
Filed Jan. 16, 1943
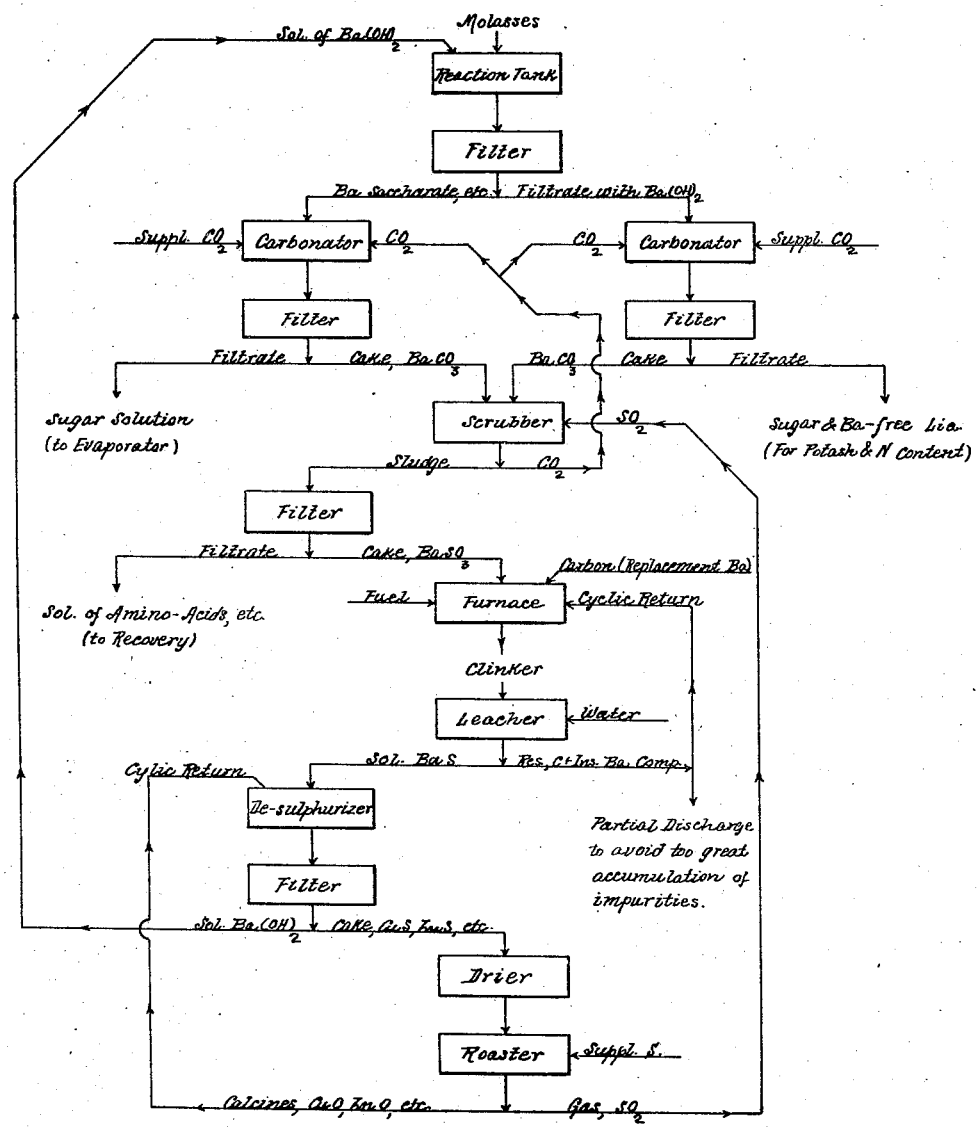
INVENTOR.
Alfred M. Thomsen

UNITED STATES PATENT OFFICE 2,380,087

PROCESSING OF MOLASSES AND THE LIKE

Alfred M. Thomsen, San Francisco, Calif.

Application January 16, 1943, Serial No. 472,563

1 Claim. (Cl. 127—47)

When the juice or sap of sugar-bearing plants is evaporated to such a consistency that it becomes immune to ordinary types of fermentation and hence can be freely handled commercially it is generally classified as "syrup." In the event, however, that concentration is carried still further so that much of the resident sucrose is separated from said syrup then the residual mother liquor is generally designated as "molasses" or as "exhausted molasses." The term "exhausted" in this connection does not mean that all sucrose has been extracted but that only that remains which cannot be readily obtained by the familiar practice of further boilings and crystallizations. Because of economic reasons much sugar is, therefore, permitted to remain in exhausted molasses.

The underlying reason for the difficulty of securing a total extraction of sucrose is the accumulation in the molasses product of the soluble constituents of the plant juice or sap. Further processing of molasses must, therefore, consist in some method for making a separation between the sucrose and the other molasses constituents thus permitting each one to be recovered by itself and parenthetically in a more valuable form.

In achieving this object I take advantage of the fact that barium will combine with a part of these constituents to form insoluble compounds and not with others. I then take advantage of the facts that some of these insoluble compounds are more easily resolved into their components than others when treated with certain acids and thus I am enabled to make a further separation.

The use of barium in desugaring molasses is, of course, very old so my process resides not in the use of this reagent but rather in the method whereby I have made it possible to use it in a cyclic manner without recourse to the excessively high temperatures involved in the re-burning of barium carbonate to form the oxide. Simultaneously, I have made these various steps the means whereby a further separation of valuable components of the molasses, notably amino-acids, can be profitably recovered.

A preferred version of by process is presented in the attached flow sheet and will be fully explained at a later place but a few words of explanation will be given here as to the difficulties inherent in the use of barium as now practiced. As already mentioned these rest upon the technical fact that the carbonate of barium will only convert to oxide at such extremely high temperatures that the electric furnace is the only really successful device that can be employed. Such means necessarily result in high costs.

I therefore employ as the basal form of barium the sulphite, $BaSO_3$, which is readily reduced by carbon to the sulphide at very reasonable, ordinary furnace temperatures, being somewhat more easy to reduce than even the sulphate, heavy spar, upon which the commercial barium industry of today is based. Starting therefore with the sulphite I first reduce it to sulphide which is water soluble and then desulphurize said solution by the action of copper and zinc oxides. I thus obtain a solution of barium hydroxide and a "sulphidized" mass of copper and zinc partly in the form of oxide and partly as sulphide.

The use of the barium hydroxide thus produced to de-sugar molasses is entirely conventional, being used in excess and the insoluble precipitate of insoluble barium compounds being removed. It follows that said precipitate, while consisting chiefly of barium saccharate, will also contain such other bodies as form insoluble combinations with barium hydroxide when used in excess.

These barium compounds are next treated with carbon dioxide and the barium saccharate becomes converted into carbonate with simultaneous liberation of the combined sugar. In addition to the saccharate certain other barium compounds are likewise decomposed particularly if the carbon dioxide be used to excess. In the latter case these combinations, chiefly of amino-acids, will go into the sugar solution and will become concentrated in the mother liquor from the sugar crystallization when said sugar is recovered, and can be subsequently recovered therefrom by standard means.

Contrariwise, it is evident that those barium combinations that remain with the barium carbonate, but in undecomposed condition, would be destroyed if the electric furnace or other high temperature means be used to form the oxide from the carbonate and thus reform the barium hydroxide for cyclic re-use. The destruction of such amino-acids, and other insoluble barium combinations of valuable organic materials, is, therefore, still another reason why such cyclic conversion of the carbonate of barium to the oxide should not be employed.

It will be self-evident that when said barium carbonate is treated with a more powerful acid, such as sulphur dioxide, then these additional barium combinations will likewise be decomposed and the result will be a total conversion of the barium into the insoluble sulphite while amino-acids, etc., will pass into solution and can be readily obtained from said solution by conventional means.

A convenient source of said sulphur dioxide is found in the use of the roaster fumes from the furnace in which the "sulphidized" oxides of copper and zinc are regenerated for cyclic re-use in the de-sulphurizing step. It will be evident that in converting barium carbonate to sulphite there will be an evolution of carbon dioxide, and manifestly, such gas can be re-cycled to the carbonating step. Meanwhile, the barium has now been restored to the condition of sulphite in which form the cycle of operations was commenced. It is evident that losses of barium can be made good anywhere in the circuit, and that such an addition would be made in the form of carbonate, hydroxide, or sulphite, or even as the native sulphate.

The flow sheet will now be fully described. It is seen to commence with a commingling of molasses with a solution of barium hydroxide and the separation of the resultant precipitate, upon a filter, from the sugar-free solution, said solution still containing an excess of barium hydroxide. To remove said soluble barium the filtrate is passed to a carbonator where it is treated with carbon dioxide and then once more filtered, yielding a cake of barium carbonate and a filtered, sugar and barium free solution. Such solution is indicated as a further source of the nitrogen and potash compounds contained therein.

The barium saccharate obtained in the first step is then passed on to a carbonator where the sugar is liberated by the action of carbon dioxide and separation made between the sugar solution and the insoluble barium component. The sugar solution is indicated as passed on to an evaporator for its recovery and the barium product is commingled with the barium carbonate yielded in the carbonation of the filtrate produced in the initial step. A "scrubber" is shown as the means for contacting this barium product with the sulphur dioxide in the next step but, manifestly, any other device could be substituted.

The carbon dioxide evolved in the scrubber is indicated as passed on to the carbonation. This is done not merely to save the carbon dioxide but more so in order to reclaim in the carbonators any sulphur dioxide which may escape decomposition in the scrubber.

The sludge from the scrubber is passed on to a filter where separation is made between the insoluble barium sulphite and the solution of amino-acids, etc., produced in the sulphur dioxide reaction. The further processing of this solution for the recovery of such contents is, manifestly, beyond the scope of this disclosure.

The barium sulphite is then commingled with carbon and passed on to a furnace where it is reduced to the sulphide and discharged as a product called "clinker." This in turn is leached with water, yielding a solution of barium sulphide and an insoluble residue consisting of excess carbon and unreduced barium. Such residue is indicated as returned cyclically to the reduction furnace with some discard to prevent too great an accumulation of unwanted impurities therein.

The solution of barium sulphide yielded by the leacher is then passed on to a desulphurizer where it meets a large excess of oxides of copper and zinc. The oxide of either metal can be used but I prefer to use a roasted natural pocket, a copper-zinc ore rather high in iron which is more convenient and cheaper than either oxide alone in its pure state. Such material roasts and filters very well.

By its use the barium sulphide becomes converted into the corresponding hydroxide and in turn the oxides of the metals are in part converted into sulphides. By using the oxides in large excess the operation is much facilitated and hastened. By means of a filter separation is then made between the solution of barium hydroxide and the insoluble metallic sulphides.

In this manner has now been produced a solution of barium hydroxide, which is returned cyclically to fresh molasses and a product containing the sulphur formerly present as barium sulphide. Said product is now regenerated for use in desulphurizing by roasting and the sulphur dioxide produced in said roasting is in turn used in the scrubber to convert barium carbonate into sulphite and to liberate amino-acids.

The entire sequence of events herein described are thus seen to constitute a perfectly cyclic process, entirely self-contained except for unavoidable mechanical losses. While the use of filters is indicated throughout, manifestly any other type of device can be used in place thereof.

Minor modifications that would seriously affect the flow sheet are evidently possible without departure from the basic principles on which my process rests. Thus, molasses are but a concentrated form of the original plant juice or sap with a part of the sugar removed. Evidently the entire sequence of operations could be applied as well to a concentrated syrup or to the plant juice or sap itself. I deem such modifications to be within the scope of my disclosure.

Minor changes in routine are likewise possible. Thus the step consisting of the treatment with carbon dioxide could be entirely eliminated. If the saccharate were treated directly with sulphur dioxide then, manifestly, the sugar solution would contain the amino-acid item as well. On evaporating to recover the sugar said amino-acids would become concentrated in the mother liquor from sugar crystallization and could be conveniently and economically recovered therefrom. It would also be possible to substitute some other mineral acid, such as sulphuric, in place of sulphur dioxide, although necessarily at a somewhat greater expense. All such minor changes I likewise regard as being within the scope of my disclosure.

While my process can be applied to either molasses, syrup or juice there is one condition that must be met, namely, the material processed must be substantially free from invert sugars as such materials are decomposed by barium hydroxide in an entirely different manner to the formation of saccharates. Fortunately the juices of many plants are almost free from invert sugars but most plants present the reverse aspect.

My process is not necessarily confined to plant juices, concentrated or otherwise, free by process of nature from invert sugar, for man has learned of various ways in which invert sugar can be removed without affecting the sucrose. One such way is by the use of a ferment which yields no invertase, of which several are known. While any description along this line is definitely beyond the scope of this disclosure, I wish to state that after such removal of invert sugar all plant juices containing sucrose are amenable to be treated by the process herein disclosed.

Having thus fully described my process, I claim:

The extraction of sucrose from impure solutions of same in any state of concentration but substantially free from invert sugar which comprises; commingling said solution of sucrose with an excess of barium hydroxide; separating the barium saccharate produced; converting said barium saccharate into barium carbonate by treatment with carbon dioxide with simultaneous liberation of the sucrose; separating said barium carbonate from the sucrose solution; converting the carbonate of barium into barium sulphite by the addition of sulphur dioxide produced in a subsequent step; reducing said barium sulphite to barium sulphide and making a water solution of same; desulphurizing said barium sulphide solution by the addition of metallic oxides capable of removing the sulphur, thus forming barium hydroxide and the corresponding metallic sulphides; separating the metallic sulphides from the barium hydroxide solution and returning the latter cyclically to fresh impure solutions of sucrose; roasting said separated metallic sulphides to obtain the regenerated oxides and sulphur dioxide; returning said oxides and said sulphur dioxide to the process for he conversion of barium sulphide and barium carbonate, respectively, where and as previously indicated.

ALFRED M. THOMSEN.